US012454074B2

(12) United States Patent
Biehler et al.

(10) Patent No.: US 12,454,074 B2
(45) Date of Patent: Oct. 28, 2025

(54) SEAMLESS FORM SYSTEM FOR STACKED POTTERY FORMS

(71) Applicants: Lauren Biehler, Atlanta, GA (US); Chadd Biehler, Petaluma, CA (US)

(72) Inventors: Lauren Biehler, Atlanta, GA (US); Chadd Biehler, Petaluma, CA (US)

(73) Assignee: The Pottery Toolkit LLC., Atlanta, GA (US)

( * ) Notice: Subject to any disclaimer, the term of this patent is extended or adjusted under 35 U.S.C. 154(b) by 83 days.

(21) Appl. No.: 18/586,298

(22) Filed: Feb. 23, 2024

(65) Prior Publication Data

US 2025/0269556 A1 Aug. 28, 2025

(51) Int. Cl.
*B28B 7/34* (2006.01)
*B28B 7/00* (2006.01)

(52) U.S. Cl.
CPC .............. *B28B 7/0064* (2013.01); *B28B 7/34* (2013.01)

(58) Field of Classification Search
None
See application file for complete search history.

(56) References Cited

PUBLICATIONS

GR Pottery Forms—Stacks, https://web.archive.org/web/20200808033729/https://grpotteryforms.com/collections/stacks, Aug. 8, 2020 (Year: 2020).*

* cited by examiner

*Primary Examiner* — Yung-Sheng M Tsui
*Assistant Examiner* — Melody Tsui
(74) *Attorney, Agent, or Firm* — My Patent Guys; Christopher Pilling

(57) ABSTRACT

The present invention provides a seamless form system designed to encase stacked pottery forms, creating a seamless surface for molding clay. This invention addresses issues such as unwanted seams, form shifting, and moisture damage. These issues are prevalent in traditional stackable wood or plaster forms. By providing a unitary, continuous piece without joints or seams, it ensures a smooth finish in the final ceramic products and extends the lifespan of pottery forms. The system simplifies the pottery-making process, enhances product quality, and supports sustainable practices. Ideal for artisans and manufacturers, the system improves pottery and ceramics production by enabling the creation of higher-quality, seamless items with improved efficiency.

15 Claims, 7 Drawing Sheets

SEAMLESS FORM SYSTEM FOR STACKED POTTERY FORMS

CROSS-REFERENCE TO RELATED APPLICATIONS

N/A

BACKGROUND OF THE INVENTION

1. Field of the Invention

The present invention generally relates to pottery tools but more particularly a seamless form system for stacked pottery forms.

2. Description of Related Art

In the field of pottery and ceramics production, the use of stackable wood forms represents a traditional and prevalent method for molding clay into various shapes. These forms, resembling inverted cookie cutters, are essential tools for artisans aiming to craft items like plates, bowls, and other ceramic objects by shaping clay around these wood or plaster molds. Despite their widespread use, these stackable forms are plagued by a series of recognized issues that detract from their effectiveness and the quality of the final ceramic products.

The primary challenge associated with these forms arises from the seams or gaps that emerge when multiple forms are stacked to create deeper objects. These gaps lead to the formation of ridges or lines in the clay, adversely affecting the aesthetic and structural integrity of the finished products. This problem is acknowledged by industry leaders, which highlights the difficulty in avoiding these seams due to the inherent design of the stackable forms.

Furthermore, the stackable nature of these forms introduces additional complications, including the potential for the forms to shift or slide under the weight of the clay, the susceptibility of the wood to absorb moisture which can lead to warping and deterioration, and the difficulty in removing the forms from the shaped clay without damaging the work. These issues, combined with the risk of the wood developing mold or becoming dented and scratched, significantly limit the utility and lifespan of traditional stackable wood forms. Consequently, a solution is needed.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

It is a particular object of the invention to provide a seamless form adapted to encase an arrangement of stacked pottery forms to create a seamless outer surface for molding and forming clay.

In order to do this, in one aspect of the invention a system is provided, comprising a seamless form having a top surface and a perimeter surface constructed from a resilient material, wherein the seamless form is a single, continuous piece without joints, seams, or assembled parts; and, wherein the seamless form is configured to fit over and encase an arrangement of stacked pottery forms thereby creating a seamless outer surface.

In one embodiment, the resilient material is flexible, durable, and impenetrable to moisture. In another embodiment, the resilient material is silicone. In one embodiment, the seamless form is configured to prevent a formation of seams or gaps in clay molded over the seamless outer surface. In another embodiment, the seamless outer surface eliminates the need for post-molding corrections associated with seams or gaps in the molded clay. In one embodiment, the perimeter surface is sloped. In one embodiment, the seamless form further comprises a perimeter edge, wherein the perimeter edge connects the seamless outer surface to an inner surface, the inner surface configured to retain and secure the arrangement of stacked pottery forms such that the arrangement of stacked pottery forms are prevented from shifting or movement when clay is molded over the seamless outer surface.

In another aspect of the invention, a method is provided, comprising steps (a) stacking an arrangement of a plurality of stacked pottery forms, wherein the arrangement has a size and shape; (b) selecting a seamless form having a size and shape corresponding to the size and shape of the arrangement of the plurality of stacked pottery forms; (c) encasing the arrangement of a plurality of stacked pottery forms with the seamless form to create a seamless outer surface; (d) molding clay over the seamless outer surface to form a pottery item; and, (e) removing the molded clay from the seamless outer surface.

The foregoing has outlined rather broadly the more pertinent and important features of the present disclosure so that the detailed description of the invention that follows may be better understood and so that the present contribution to the art can be more fully appreciated. Additional features of the invention, which will be described hereinafter, form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE INVENTION

The following description is provided to enable any person skilled in the art to make and use the invention and sets forth the best modes contemplated by the inventor of carrying out their invention. Various modifications, however, will remain readily apparent to those skilled in the art, since the general principles of the present invention have been defined herein to specifically provide a seamless form system for stacked pottery forms.

It is to be understood that the terminology used herein is for the purpose of describing particular embodiments only and is not intended to be limiting. The terms "a" or "an," as used herein, are defined as to mean "at least one." The term "plurality," as used herein, is defined as two or more. The term "another," as used herein, is defined as at least a second or more. The terms "including" and/or "having," as used herein, are defined as comprising (i.e., open language). The term "providing" is defined herein in its broadest sense, e.g., bringing/coming into physical existence, making available, and/or supplying to someone or something, in whole or in multiple parts at once or over a period of time. These terms generally refer to a range of numbers that one of skill in the art would consider equivalent to the recited values (i.e., having the same function or result). In many instances these terms may include numbers that are rounded to the nearest significant figure.

Figure 1:
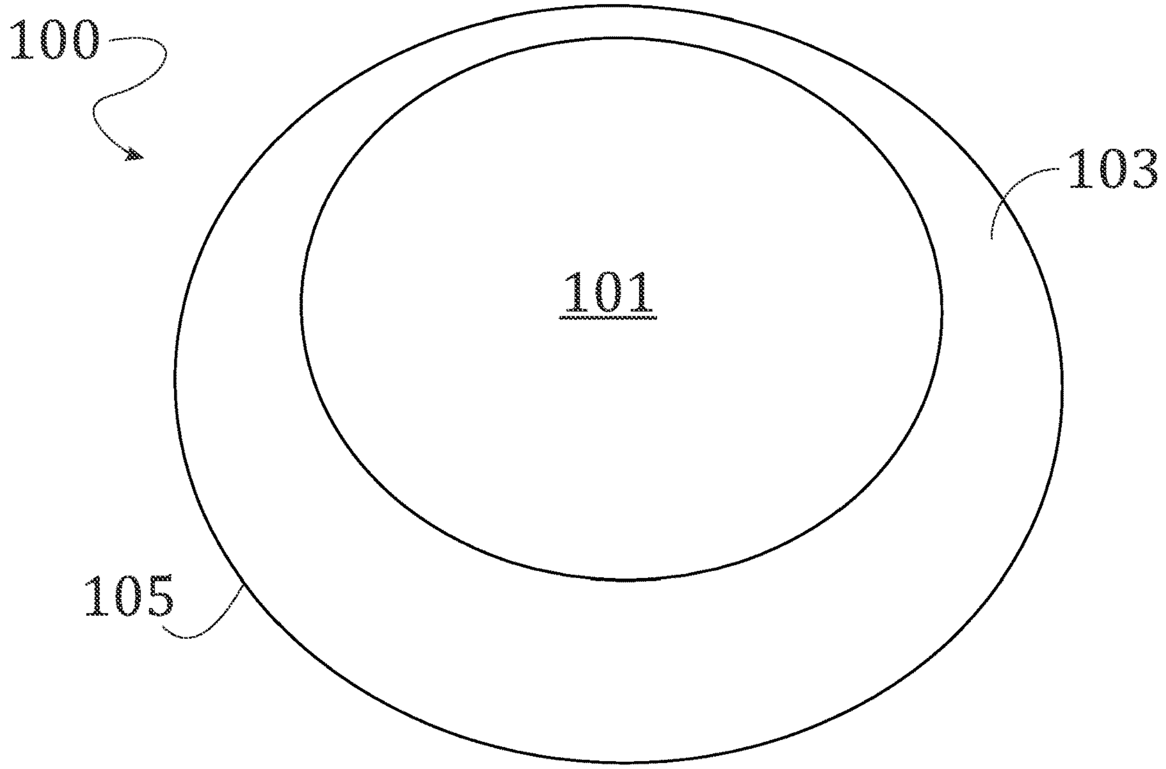
FIG. 1 is a top perspective view of a seamless form according to an embodiment of the present invention.

FIG. 1 is a top perspective view of a seamless form according to an embodiment of the present invention. Referring now to FIG. 1, the seamless form 100 is illustrated. In one embodiment, the seamless form 100 comprises a top surface 101 and a curved or sloped perimeter surface 103 ending at a perimeter edge 105, wherein the seamless form is shaped like a bowl or plate. In some embodiments, the top surface 101 is flat. In other embodiments, the top surface is sloped. In one embodiment, the seamless form is constructed from a silicone rubber, more specifically a liquid silicone ZY-870 series. In other embodiments, other silicone rubbers may be used. And yet in alternative embodiments, similar materials may be used, including but not limited to, thermoplastic rubbers, nitrile, vinyl, neoprene, or natural rubber. It should be understood that the specific shape illustrated is just one example, and the seamless form 100 is configured to encase, cover or fit over a specific combination of stacked pottery forms. Thus, depending on the arrangement of stacked pottery forms, the appearance of the seamless form may vary. For example, the arrangement of stacked pottery forms may be oval, spherical square, rounded rectangular, hexagonal, octagonal, triangular, pyramid-like, or similar, wherein the seamless form shape will correspond to the specific shape and arrangement of stacked pottery forms.

In some embodiments, the curved or sloped perimeter surface 103 has no slope, i.e. the perimeter surface 103 is perpendicular to the top surface 101. For the purposes of the disclosure and claims, the angle between the top surface 101 and the perimeter surface is generally between 90 and less than 180 degrees. However, in alternative embodiments, the perimeter surface 103 may have a reverse slope, i.e. an angle less than 90 degrees corresponding to a bowl, vessel, or vase with a top opening smaller than its base opening.

Figure 5A:
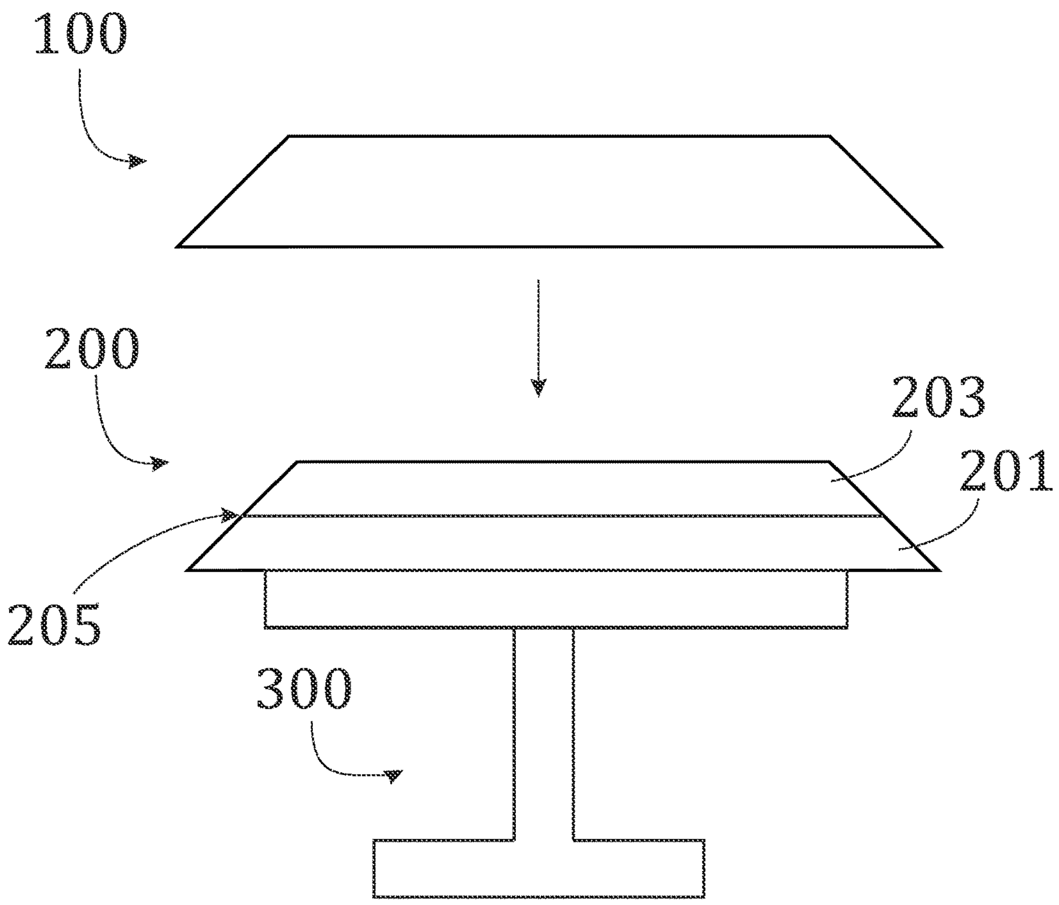
FIGS. 5A-B illustrates a seamless form system for stacked pottery forms according to an embodiment of the present invention.

In the illustrated example, the shape shown in FIG. 1, is configured to fit over the arrangement of stacked pottery forms 200 shown in FIG. 5A. A critical aspect of the present invention is that the seamless form 100 is free of marks, seams, or other irregularities that could be transferred into the clay as the user molds the clay over the seamless form to form a pottery item during use.

Figure 2:
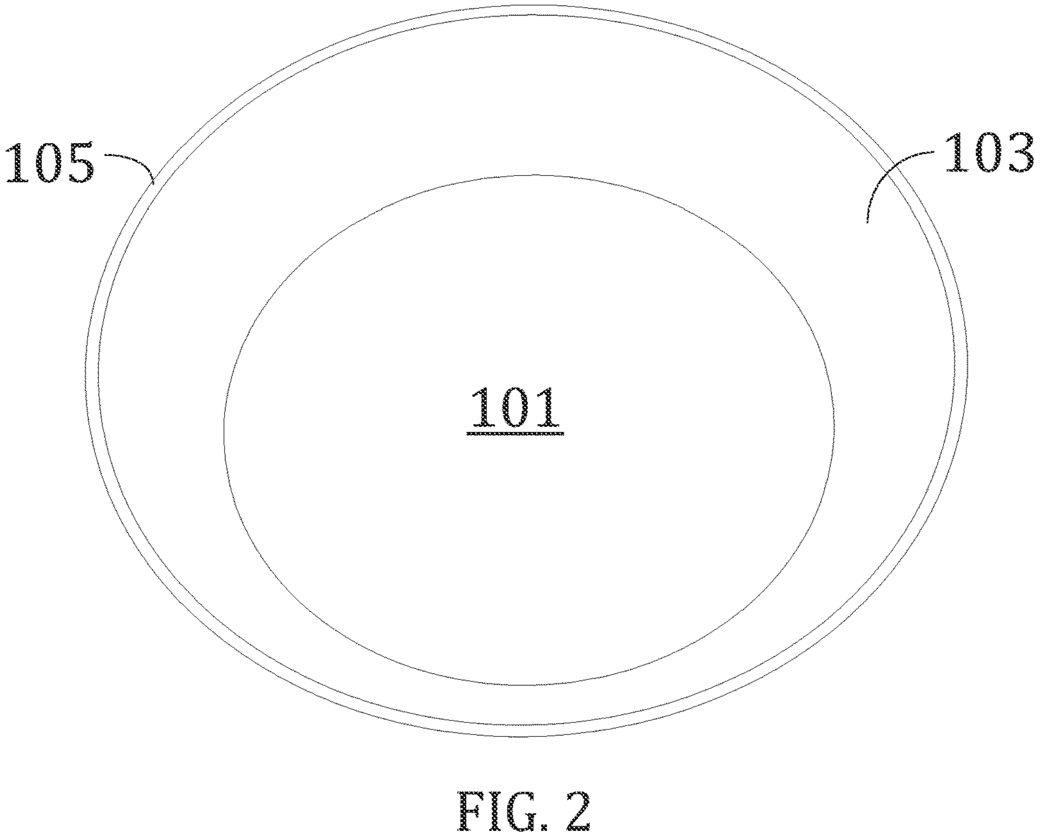
FIG. 2 is a bottom perspective view of the seamless form of FIG. 1.

FIG. 2 is a bottom perspective view of the seamless form of FIG. 1. Referring now to FIG. 2, the underside of the seamless form 100 is illustrated. This view shows the surfaces that make contact with the stacked pottery forms, including the underside of the top surface 101 and the underside of the sloped surface 103.

Figure 3:
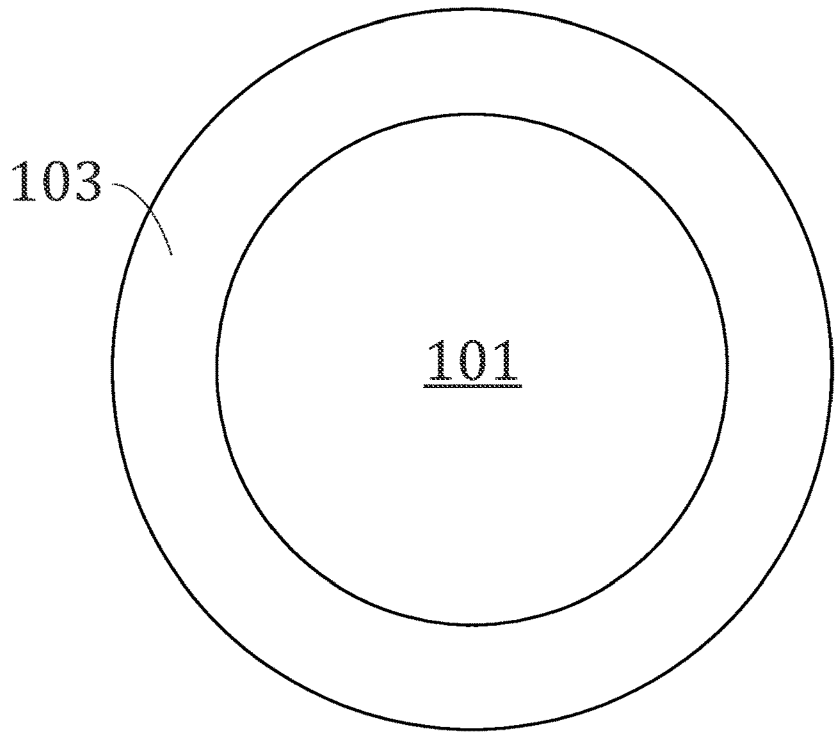
FIG. 3 is a top view of the seamless form of FIG. 1.
Figure 4:
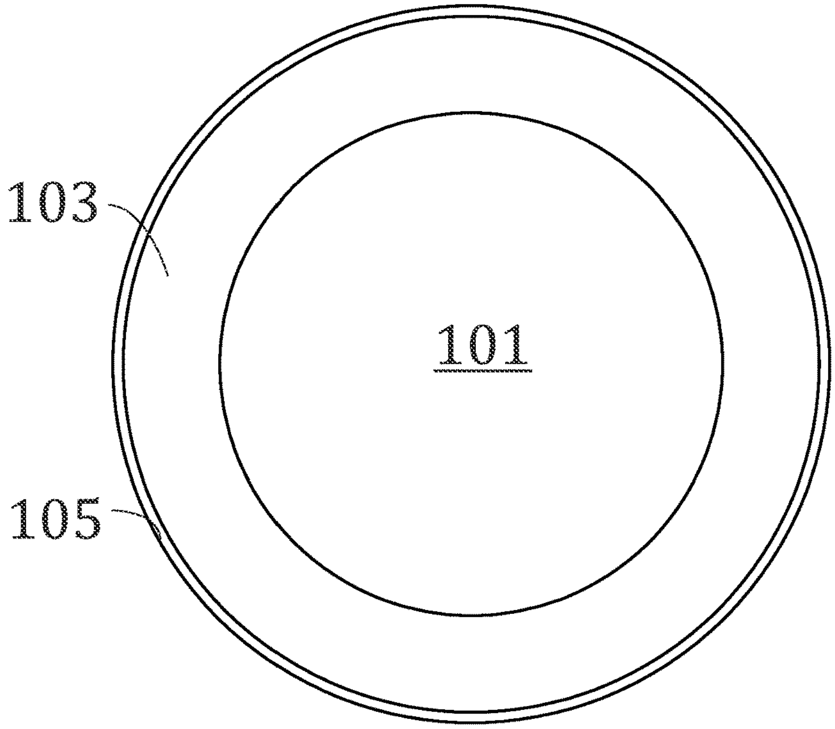
FIG. 4 is a bottom view of the seamless form of FIG. 1.

FIG. 3 illustrates the top view of the seamless form 100 and FIG. 4 illustrates the bottom view of the seamless form 100 of FIG. 1. The perimeter edge 105 connects the underside surface to the top surface illustrated in FIGS. 1 and 3.

Figure 5B:
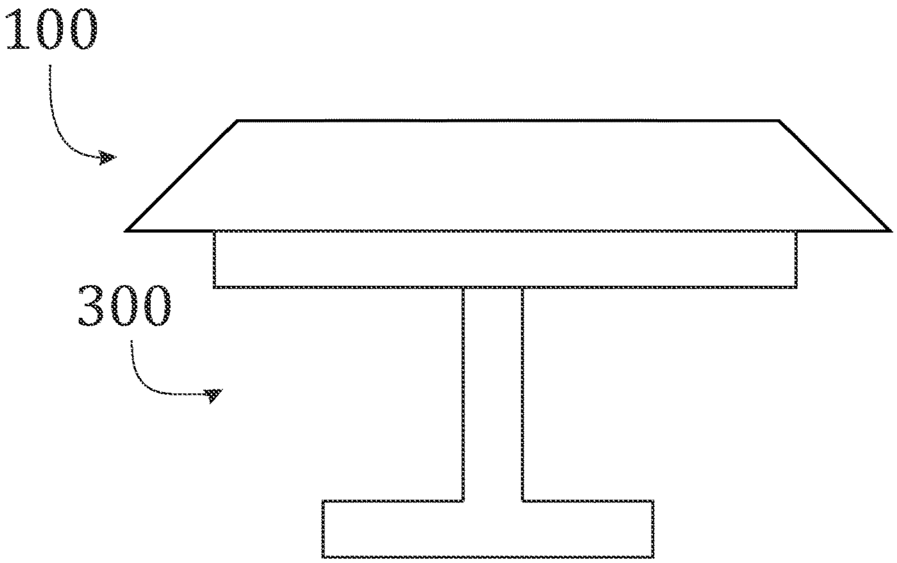

Referring now to FIGS. 5A-B, during use, a user arranges a specific arrangement of stacked pottery forms 200, comprising two or more individual forms 201, 203, stacked on top of each other creating at least one seam or gap 205 between the individual forms. As highlighted in background, when a user molds the clay over these pottery forms, the seams or gaps appear in the clay after molding, requiring the user to correct the deformity after the molding process prior to firing the clay in an oven as is well known in the art. In the illustrated example, the specific arrangement of stacked pottery forms 200 are positioned on a pottery stand or wheel/spinner 300. However, the use of the stand is not required. To use the seamless form 100, the user simply places the seamless form over the specific arrangement of stacked pottery forms 200 to completely encase the stacked pottery forms. Then, the user would mold or form the clay as they typically would and advantageously the clay would not have any deformities from the seams or gaps of the specific arrangement of stacked pottery forms. This significantly improves the process of working with stacked pottery forms, while also protecting the stacked pottery forms, which are typically wooden, from moisture concerns, thus extending their life. This also saves the user time that would normally need to be devoted to resolving the problems created by the stacked pottery forms during use, e.g. removing seams visible in the clay after use. Simply put, the seamless forms of the present invention prevent the flaws inherent in working with stacked pottery forms.

Figure 6:
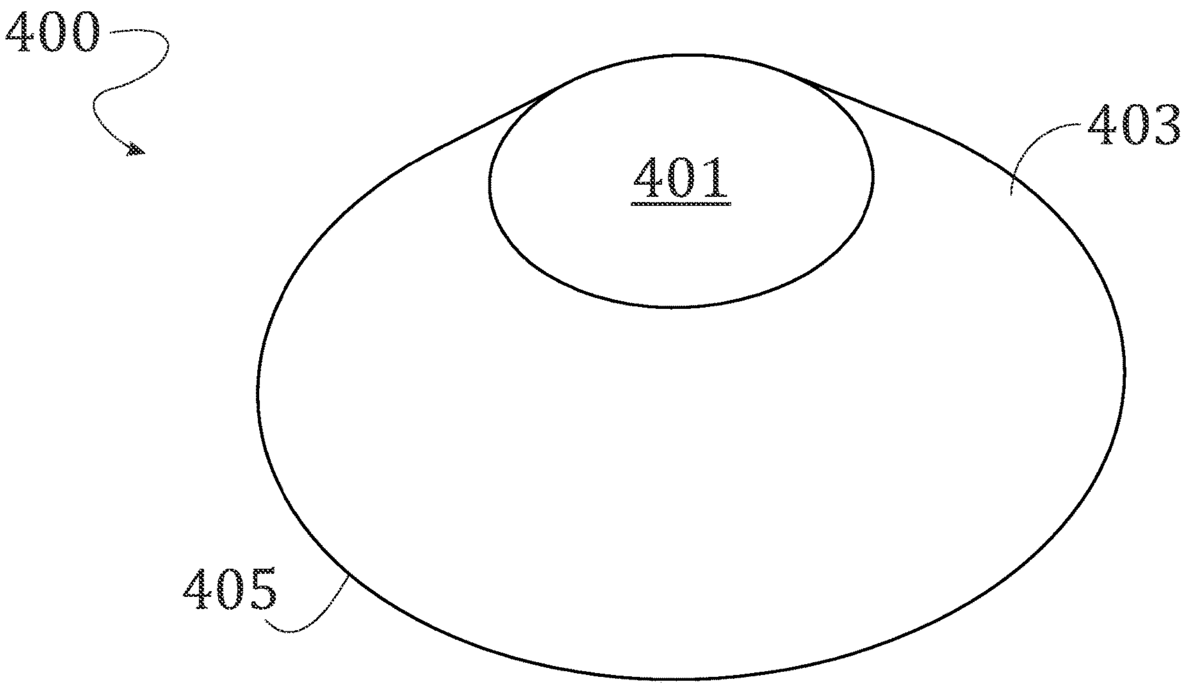
FIG. 6 is a top perspective view of a second seamless form according to an embodiment of the present invention.

As previously discussed, the shape and size of the seamless form is dependent on the specific arrangement of stacked pottery forms. As an example, referring to FIG. 6, an alternative seamless form 400 is illustrated. In one embodiment, the alternative seamless form 400 is deep bowl shaped having a flat top surface 401 and a curved or sloped perimeter surface 403 ending at a perimeter edge 405. The seamless form 400 is configured for a specific arrangement of stacked pottery forms 500 illustrated in FIG. 10A. As one skilled in the art would appreciate, the stacked pottery forms 500 are a continuation, i.e. more forms stacked together, of the stacked pottery forms 200 shown in FIG. 5A. As mentioned above, this creates a deeper bowl having larger sloped sides. It should be emphasized that these illustrated forms, both the seamless forms and the corresponding arrangement of specific stacked pottery forms, are just examples, and modifications of the size, shape, depth, etc. are possible.

Advantageously, since the outer surface of the alternative seamless form 400 is free from marks, seams, gaps, etc., when the user molds the clay on the form, there are no seams, gaps, or markings in the clay after using the form and removing the clay from the form.

Figure 7:
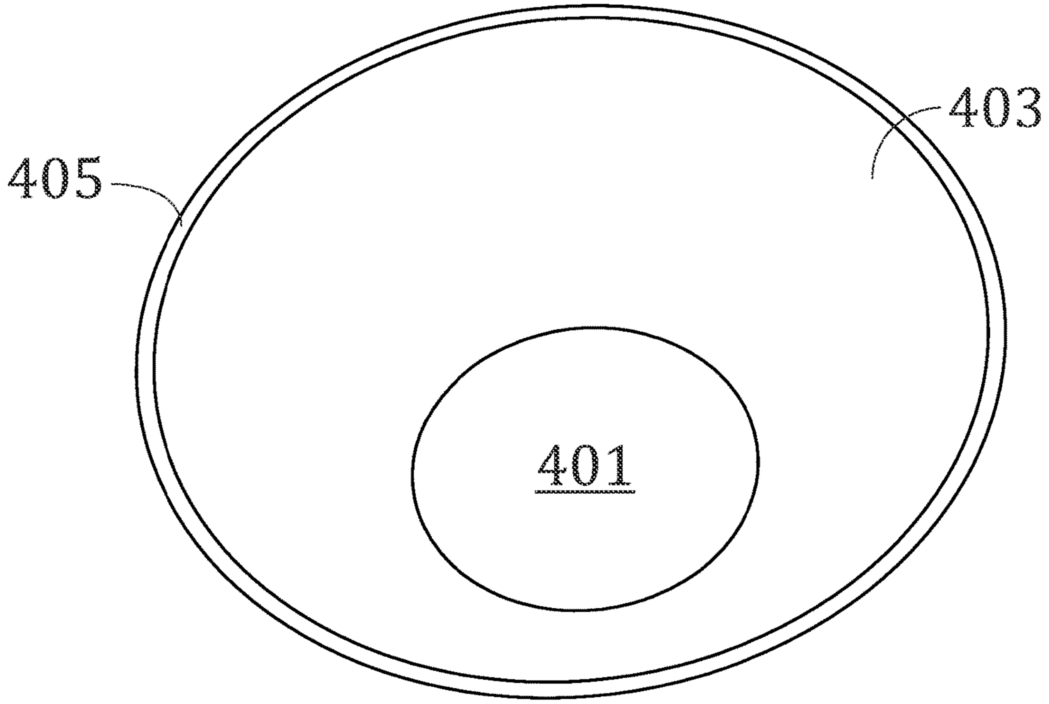
FIG. 7 is a bottom perspective view of the second seamless form of FIG. 6.
Figure 8:
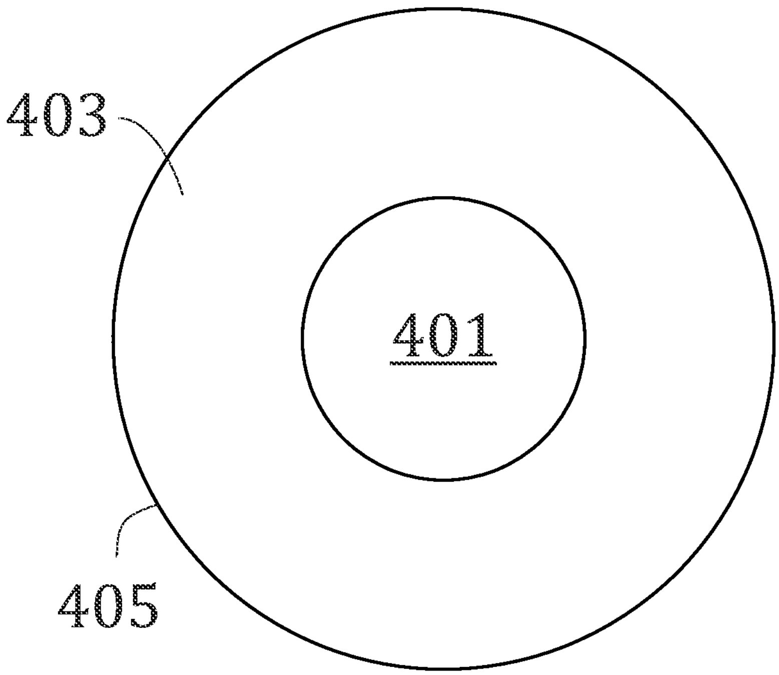
FIG. 8 is a top view of the second seamless form of FIG. 6.
Figure 9:
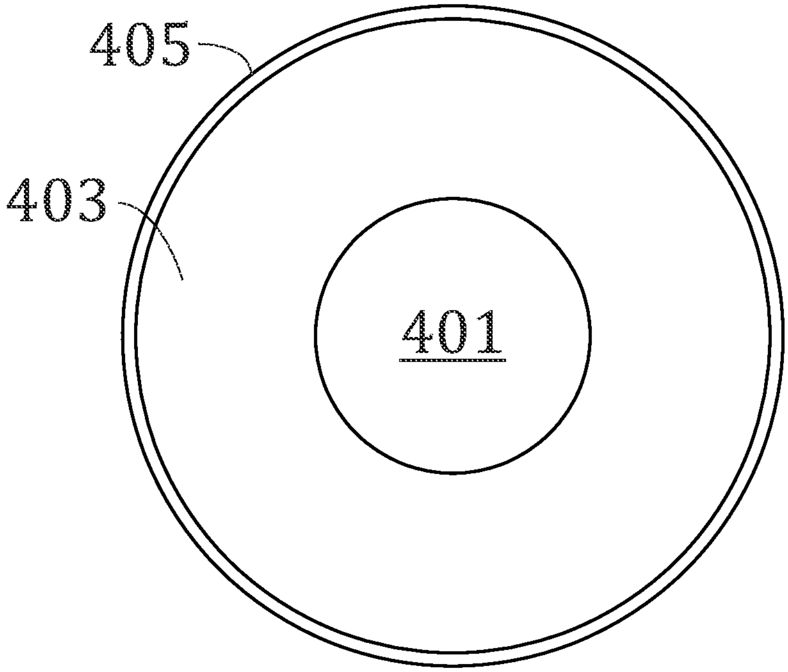
FIG. 9 is a bottom view of the second seamless form of FIG. 6.

FIGS. 7-9 illustrate the underside, top, and bottom of the alternative seamless form 400 respectively. The underside perspective view of FIG. 7 shows the surfaces that make contact with the stacked pottery forms, including the underside of the top surface 401 and the underside of the sloped surface 403. FIG. 8 illustrates the top view of the seamless form 400 and FIG. 9 illustrates the bottom view of the seamless form 400 of FIG. 6. The perimeter edge 405 connects the underside surface to the top surface illustrated in FIGS. 6 and 9.

Figure 10A:
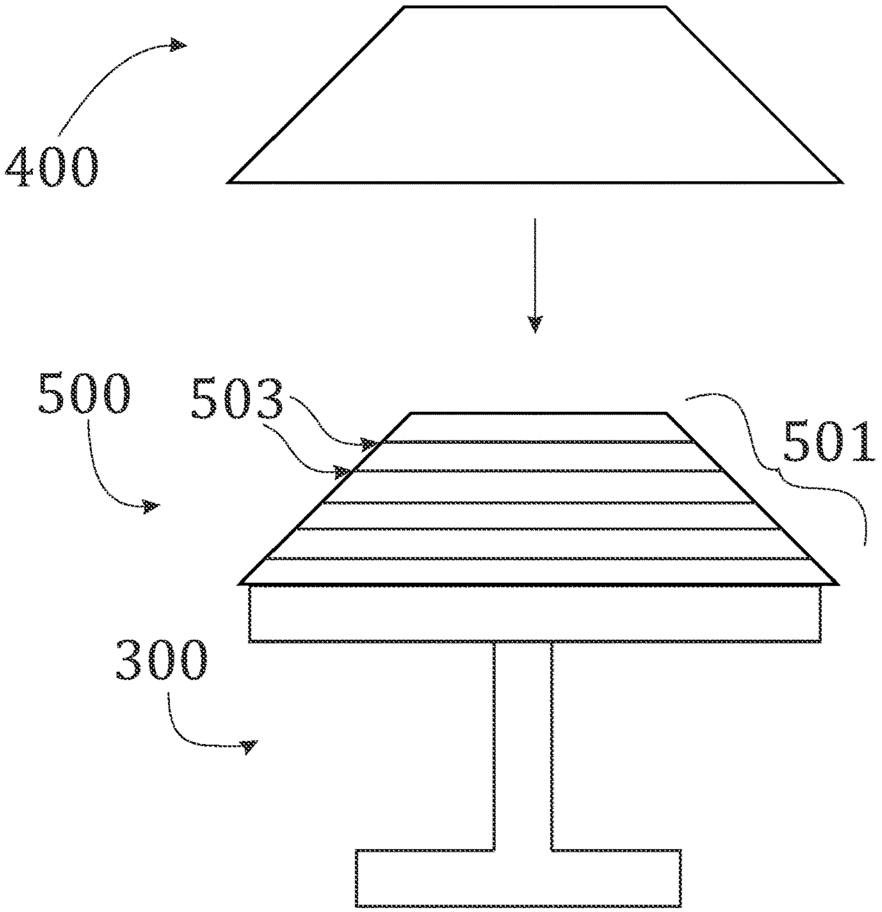
FIGS. 10A-B illustrates a seamless form system for stacked pottery forms using the second seamless form of FIG. 6 according to an embodiment of the present invention.
Figure 10B:
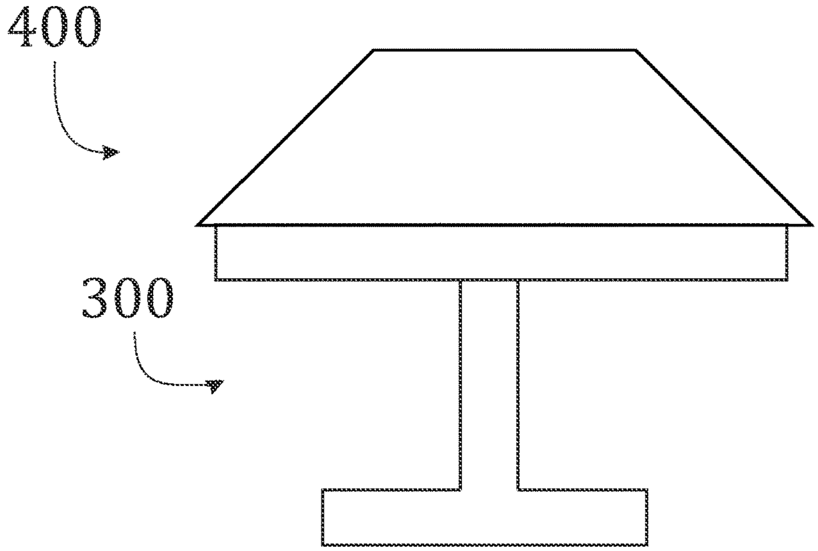

Turning to FIGS. 10A-B, in practice, a user selects a combination of stacked pottery forms 500, consisting of a plurality of separate forms 501, arranged atop one another which unintentionally creates a plurality of seams or gaps 503 between them. As previously discussed, molding clay over these forms results in the transfer of seam or gap impressions to the clay, necessitating post-molding corrections before the clay is fired. Further, if there are any imperfections, dents, or similar in the forms those would also be transferred into the clay. In the illustrated example, the specific arrangement of stacked pottery forms 500 is placed on a pottery stand or wheel/spinner 300, though the stand's use is optional. To employ the seamless form 400, the user simply encases the arranged stacked pottery forms 500 as illustrated. Subsequently, the user shapes or molds the clay in their usual manner. However, with the seamless form 400 in place, the clay remains free from the seam-induced deformities typical of the stacked form arrangement. As previously discussed, the present invention enhances the usability of stacked pottery forms, safeguarding the traditionally wood-based stackable forms from moisture damage, prolonging their lifespan, and conserving time otherwise spent on rectifying the seam-related issues inherent in using stacked forms. In essence, the seamless form system of the present invention eliminates the common pitfalls associated with utilizing stacked pottery forms.

Although there are no limitations of the thickness of the seamless form, it should be minimally thick in order to not extend the scale or size of the stacked pottery forms to a great extent. However, the thickness must be such that the integrity of the seamless form is not compromised. Further, the sizes of the seamless forms are selected for a specific arrangement of stacked pottery forms of the prior art such that when the seamless forms cover the stacked forms there is minimal clearance between the inner surfaces of the seamless form and the outer surfaces of the stacked forms to prevent any shifting or movement of the seamless forms during use. This is critical, as previously mentioned, as the arrangement of stacked pottery forms do not connect together so shifting is likely which, when it occurs, can greatly compromise the integrity of the finished product forcing the user to start over.

Figure 11:
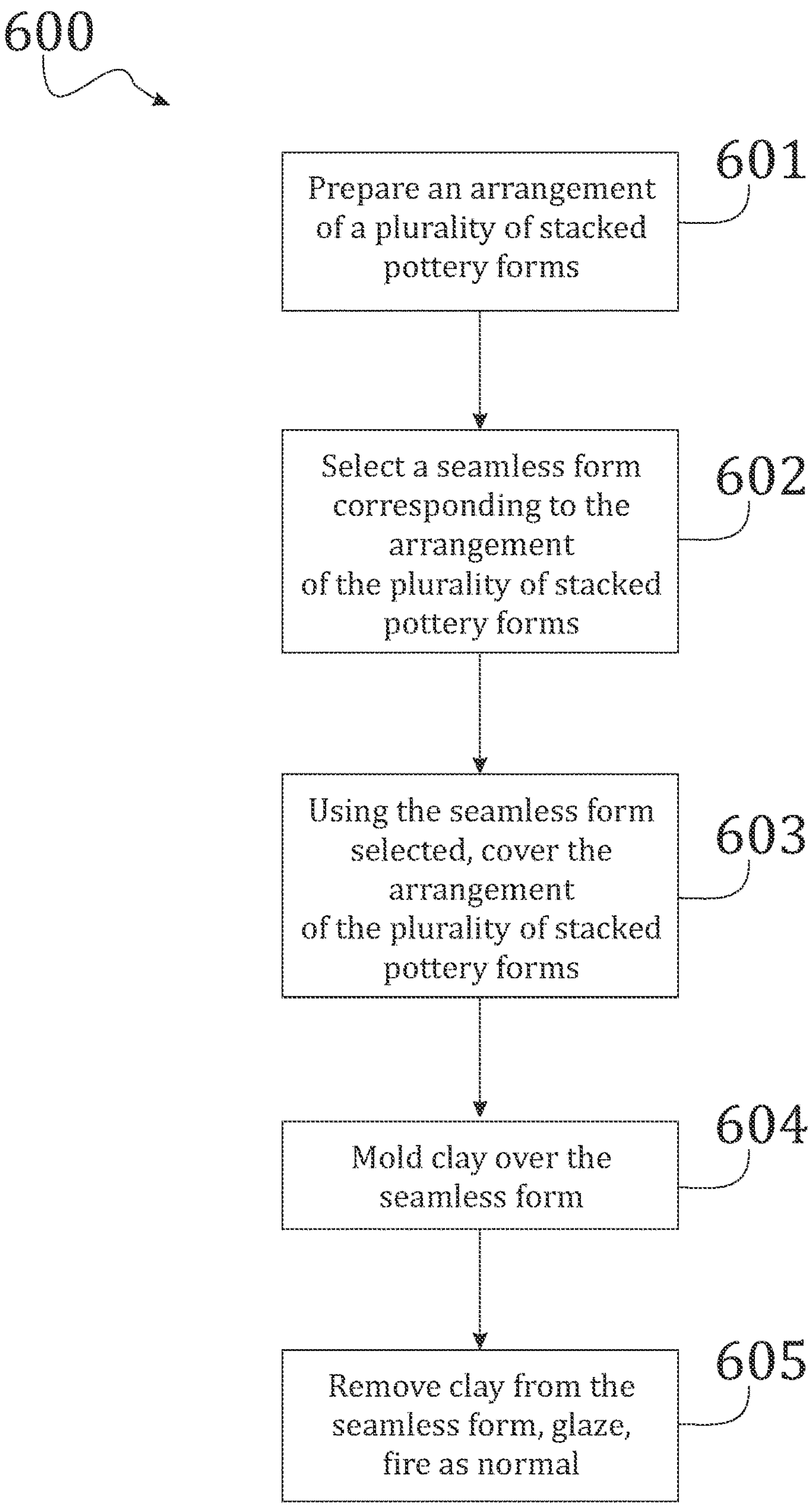
FIG. 11 is a flow diagram illustrating a method of using the seamless form system for stacked pottery forms according to an embodiment of the present invention.

FIG. 11 is a flow diagram illustrating a method of using the seamless form system for stacked pottery forms according to an embodiment of the present invention. Referring now to FIG. 11, the method 600 is shown. In one embodiment, in step 601, a user prepares an arrangement of a plurality of stacked pottery forms. The plurality of stacked pottery forms may be in any number, combination, or shape, as would be typical in the prior art. Next, in step 602, the user selects a corresponding seamless form for the arrangement of the plurality of stacked pottery forms. As previously mentioned, there are non-limiting options of the size and shape of the seamless form. For example, if the user arranged four square tapered pottery forms stacked to create a square bowl, the user would select a seamless form that resembles the size (depth, i.e. number of stacked forms) and shape (square). Many options are available, and theoretically the user would have purchased one or more seamless forms corresponding to their existing pottery forms. In one embodiment, the seamless form system of the present invention is configured for use with the wooden forms available at GR Pottery Forms, the largest manufacturer of wooden pottery forms. The present invention is not intended to replace a user's existing forms, but improve the process of using the forms and alleviate the pitfalls of the existing forms of the prior art.

Next in step 603, the user takes the selected seamless form and covers the arrangement of the plurality of stacked pottery forms such that the seamless form fits over and encases the plurality of stacked pottery forms completely. There should be minimal slack or clearance between the inner surfaces of the seamless form and the outer surfaces of the plurality of stacked pottery forms so that there is no unwanted movement or shifting during use. Next in step 604, the user molds clay over the seamless form as they typically would as is well known in the art. In some embodiments, the user may use a pottery wheel or stand, but it is not required. Finally, in step 605, the user removes the clay from the seamless form, makes any additions or adjustments, and proceeds with the pottery process as is well known in the art, including but not limited to glazing, firing, etc.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternative embodiments are contemplated, and can be made without departing from the spirit and scope of the invention.

It should further be noted that throughout the entire disclosure, the labels such as left, right, front, back, top, bottom, forward, reverse, clockwise, counterclockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, references to "first," "second," "third," and etc. members throughout the disclosure (and in particular, claims) are not used to show a serial or numerical limitation but instead are used to distinguish or identify the various members of the group.

What is claimed is:

1. A system comprising:

a plurality of pottery forms configured to be stacked;

a seamless form having a top surface and a perimeter surface constructed from a resilient material, wherein the seamless form is a single, continuous piece without joints, seams, or assembled parts; and, wherein the seamless form is configured to fit over and encase an arrangement of the stacked pottery forms thereby creating a seamless outer surface.

2. The system of claim 1, wherein the resilient material is flexible, durable, and impenetrable to moisture.

3. The system of claim 2, wherein the resilient material is silicone.

4. The system of claim 1, wherein the seamless form is configured to prevent a formation of seams or gaps in clay molded over the seamless outer surface.

5. The system of claim 4, wherein the seamless outer surface eliminates the need for post-molding corrections associated with seams or gaps in the molded clay.

6. The system of claim 1, wherein the perimeter surface is sloped.

7. The system of claim 1, wherein the seamless form further comprises a perimeter edge, wherein the perimeter edge connects the seamless outer surface to an inner surface, the inner surface configured to retain and secure the arrangement of stacked pottery forms such that the arrangement of stacked pottery forms are prevented from shifting or movement when clay is molded over the seamless outer surface.

8. A method comprising steps:

(a) stacking an arrangement of a plurality of stacked pottery forms, wherein the arrangement has a size and shape;

(b) selecting a seamless form having a size and shape corresponding to the size and shape of the arrangement of the plurality of stacked pottery forms;

(c) encasing the arrangement of a plurality of stacked pottery forms with the seamless form to create a seamless outer surface;

(d) molding clay over the seamless outer surface to form a pottery item; and, removing the molded clay from the seamless outer surface.

9. The method of claim 8, wherein the seamless form is constructed from a single, continuous piece without joints, seams, or assembled parts.

10. The method of claim 9, wherein the seamless form is constructed from a resilient material that is flexible, durable, and impenetrable to moisture.

11. The method of claim 10, wherein the resilient material is silicone.

12. The method of claim 8, wherein the seamless form is configured to prevent a formation of seams or gaps in clay molded over the seamless outer surface.

13. The method of claim 8, wherein the seamless outer surface eliminates the need for post-molding corrections associated with seams or gaps in the molded clay.

14. The method of claim 8, wherein the seamless form includes a top surface and a perimeter surface.

15. The method of claim 14, wherein the seamless form further comprises a perimeter edge, wherein the perimeter edge connects the seamless outer surface to an inner surface, the inner surface configured to retain and secure the arrangement of stacked pottery forms such that the arrangement of stacked pottery forms are prevented from shifting or movement when clay is molded over the seamless outer surface.

* * * * *